United States Patent [19]
Chwalek et al.

[11] Patent Number: 5,436,919
[45] Date of Patent: Jul. 25, 1995

[54] MULTIWAVELENGTH UPCONVERSION WAVEGUIDE LASER

[75] Inventors: James M. Chwalek; Gustavo R. Paz-Pujalt; Jose M. Mir, all of Rochester; William J. Grande, Pittsford, all of N.Y.

[73] Assignee: Eastman Kodak Company, Rochester, N.Y.

[21] Appl. No.: 186,068

[22] Filed: Jan. 25, 1994

[51] Int. Cl.$^6$ .................. H01S 3/17; H01S 3/0941; G02F 1/23
[52] U.S. Cl. .................................. 372/7; 372/68; 372/41; 372/50; 372/23; 372/75; 385/131
[58] Field of Search .............. 372/68, 7, 41, 50, 23, 372/75; 385/130–132

[56] References Cited

U.S. PATENT DOCUMENTS

| | | | |
|---|---|---|---|
| 3,599,109 | 8/1971 | Guggenheim | 372/68 |
| 5,226,049 | 7/1993 | Grubb | 372/6 |
| 5,290,730 | 3/1994 | McFarlane et al. | 372/69 |

FOREIGN PATENT DOCUMENTS 0534750  3/1993  European Pat. Off. ...... H01S 3/094

OTHER PUBLICATIONS

Wada, O. "Optoelectronic Integrated Circuits", Chptr 27 in *Electro Optics Handbook*, McGrawHill, New York 1993 pp. 27.17, 27.26.

Yeh, D. C. et al. "Efficient Frequency Conversion of $Tm^{3+}$...", J. of Applied Physics 63(9), 1 May 1988 pp. 4644–4650.

F. Auzel et al, Comparison and Efficiency of Materials For Summation of Photons Assisted by Energy Transfer, J. of Luminescence, 8, 32, 1973, pp. 32–43 No month avail.

G. Ozen et al, Enhanced $Tm3+$ blue emission in Tm, Yb, co–doped fluorophosphate glasses due to back energy transfer processes, Appl. Phys. Lett. 62, pp. 928–930, 1993 Mar.

J. Roman et al, Neodymium–doped glass channel waveguide laser containing an intergrated distributed Bragg reflector, Appl. Phys. 61 pp. 2744–2746, 1992 (Dec.).

*Primary Examiner*—Rodney B. Bovernick
*Assistant Examiner*—Robert McNutt
*Attorney, Agent, or Firm*—Raymond L. Owens

[57] ABSTRACT

A multiwavelength upconversion waveguide laser producing visible or ultraviolet wavelength radiation comprising a semiconductor laser diode producing relatively long wavelength radiation, a channel waveguide having a thin film material which converts the relatively long wavelength radiation into visible or ultraviolet wavelength radiation, and a optical resonator which recirculates the visible or ultraviolet wavelength radiation. The optical resonator may use an output optical coating or one or more Bragg grating reflectors as an output coupler. One or more optical resonators may be used to produce one or more visible or ultraviolet radiation wavelengths. One or more independently controllable lightwave modulators are used to modulate the visible or ultraviolet wavelength radiation.

19 Claims, 3 Drawing Sheets

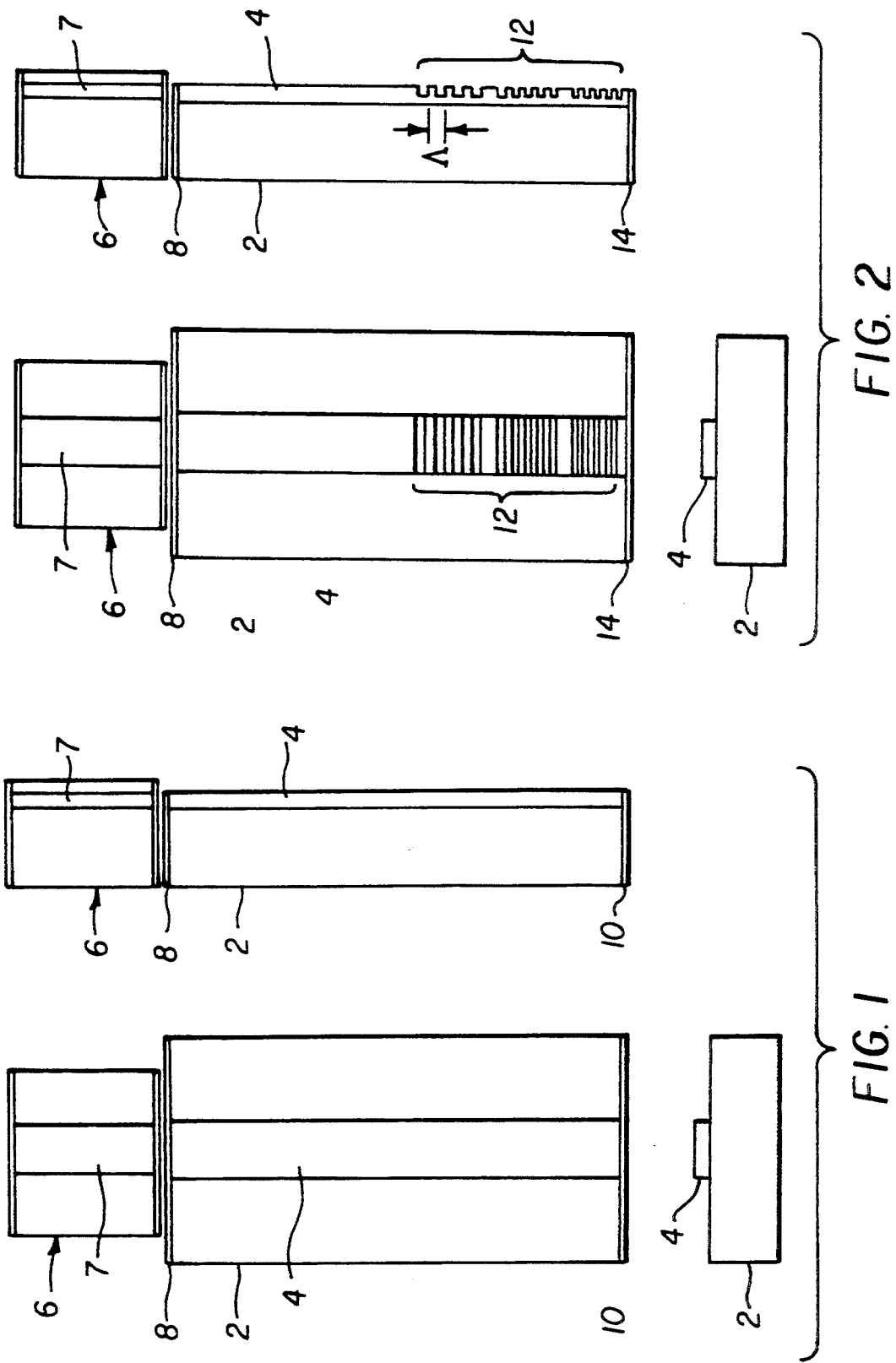

MULTIWAVELENGTH UPCONVERSION WAVEGUIDE LASER

CROSS REFERENCE TO RELATED APPLICATIONS

Reference is made to commonly assigned U.S. application Ser. No. 08/186,400 filed concurrently herewith in name of Gustavo R. Paz-Pujalt et al, entitled "A Device For Converting Invisible and Visible Radiation to Visible Light and/or UV Radiation", and commonly assigned U.S. application Ser. No. 08/186,415 filed concurrently herewith in the name of Gustavo R. Paz-Pujalt et al, entitled "Highly Oriented Metal Fluoride Thin Film Waveguide Articles on a Substrate", the disclosures of which are incorporated herein.

FIELD OF THE INVENTION

The present invention relates a waveguide laser device that produces red, green, blue and ultraviolet wavelength radiation based on photon addition by an upconverting phosphor material.

BACKGROUND OF THE INVENTION

Many applications exist for compact, low cost, solid state lasers which can lase at wavelengths in the green, blue and ultraviolet (UV) regions of the spectrum. Some of the major applications include optical data storage and retrieval, color printing, color displays, and medical analysis. Various techniques are currently being pursued in order to produce compact, low cost, solid state green, blue, and ultraviolet lasers. The three primary techniques involve frequency doubling of infrared semiconductor laser diodes, the development of semiconductor laser diodes based in the zinc selenide system, and lasers based on upconverting photon addition phosphor (upconversion) materials. Although green and blue lasers have been demonstrated with frequency doubling techniques, there are still questions remaining as to their robustness, compactness, practicality and cost. Although several groups have demonstrated semiconductor laser diodes based in the zinc selenide system which lase in the blue-green region of the spectrum these semiconductor laser diodes are currently operating at performance levels well below that necessary for commercial deployment.

Recently, lasers based on upconversion materials have been demonstrated that are capable of lasing at wavelengths in the red (R), green (G), and blue (B), collectively referred to as RGB, regions of the spectrum. The upconversion materials used in these lasers are based on rare earth doped fluorides which have been produced as bulk single crystals or fluoride glass fibers. Infrared wavelength radiation absorbed by these materials is internally transferred from the absorbing species to other species in a number of steps where excited states result in emitted visible light and, in some cases, ultraviolet radiation when they decay to other lower lying energy states. Because of the wavelengths involved in the initial absorption, lasers based on these materials can be pumped by conventional semiconductor laser diodes which emit radiation at infrared or red wavelengths.

The art recognizes the metal fluoride material system Ba-Ln-F, where Ln is Yttrium (Y), Ytterbium (Yb), Praseodymium (Pr), Holmium (Ho), Erbium (Er), Thulium (Tm), or a combination thereof, as the preferred materials to convert longer wavelength radiation into shorter wavelength radiation having one or more visible or ultraviolet wavelengths by the upconversion process of photon absorption followed by emission. (See F. Auzel and D. Pecile, J. of Luminescence 8, 32 (1973)). In particular, the art recognizes the rare earth ion Yb as a sensitizing agent which can absorb infrared wavelength radiation (in the approximate range of 950 nm to 980 nm) and transfer part of that energy to one or more of the upconversion dopant species (i.e., Pr, Ho, Er, Tm). Depending on the pump wavelengths (more than one pump wavelength may be required) as well as the dopants (more than one dopant may be used) visible radiation at wavelengths in the red, green, blue, and ultraviolet regions of the spectrum have been obtained.

A specific example is the metal fluoride material of nominal composition $BaYYb_{0.99}F_8$ doped with 1% Tm (by atomic weight), which will absorb radiation at 960 nm, and transfer part of this energy to the Tm ions through a series of multi-photon excited state absorptive steps. The excited ions will then decay to lower energy states and emit radiation in the approximate ranges of 350 nm to 370 nm, 440 nm to 490 nm, 500 to 520 nm, 630 nm to 670 nm, and 760 nm to 840 nm. The art has also shown it possible to directly pump the Tm ions by using radiation at a wavelength in the range of 645 nm to 665 nm or 675 nm to 685 nm. (See G. Özen, J. P. Denis, Ph. Goldner, Xu Wu, M. Genotelle, and F. Pellé, Appl. Phys. Lett. 62, 928 (1993)). Other metal fluoride host-/rare earth dopant combinations may be used to effectively convert a portion of longer wavelength radiation to shorter visible or ultraviolet wavelength radiation. For example, the addition of Er to the above system would result in the emission of radiation in the approximate ranges of 540 nm to 560 nm and 630 nm to 670 nm.

An upconversion laser system for the conversion of infrared wavelength radiation to relatively shorter wavelengths comprising a host doped with a rare earth activator, a resonant optical cavity, and a pump source has been detailed in the European Patent Application No. 534,750 to Thrash. An upconversion process for the conversion of infrared wavelength radiation in the range of approximately 1080 to 1300 nm to relatively shorter wavelengths which involves a glass host, including optical fibers, having a concentration of rare earth activator ions is detailed in U.S. Pat. No. 5,226,049 to Grubb.

Although lasers made with bulk crystalline or glass hosts and fiber upconversion material fulfill the spectral requirements for many of the applications listed previously, they may be limited in their scope due to potential high costs associated with materials, packaging, non-compactness of the configuration, and the lack of monolithic integration with other devices.

SUMMARY OF THE INVENTION

It is the object of this invention to overcome the above drawbacks by utilizing upconversion materials in thin film form. Thin film devices are cheaper to produce, more compact, and more efficient than devices utilizing bulk crystals or fibers. This technology results in compact, low cost, RGB-UV lasers that are well suited for the applications listed previously.

This object is achieved in a multiwavelength upconversion waveguide laser producing visible or ultraviolet wavelength radiation from relatively long wavelength radiation comprising:

a) a semiconductor laser diode producing relatively long wavelength radiation;

b) a thin film material that converts the relatively long wavelength radiation into radiation having one or more visible or ultraviolet wavelengths by an upconversion process of photon absorption energy transfer followed by emission;

c) a channel waveguide for receiving the relatively long wavelength radiation the channel waveguide having the thin film material; and d) an optical resonator comprising the channel waveguide which recirculates said visible or ultraviolet wavelength radiation.

ADVANTAGES

Multiwavelength upconversion waveguide lasers according to this invention result in lower cost, more compact devices suitable for a wider variety of applications as compared to other upconversion laser systems which utilize bulk crystalline materials or glass (bulk or optical fiber) materials for the following reasons:

(i) The ease and low cost nature of the production methods associated with the multiwavelength upconversion waveguide lasers as compared to production methods associated with bulk crystalline or bulk glass or fiber materials.

(ii) The high optical intensities possible in the channel waveguides of the multiwavelength upconversion waveguide lasers reduce the length of the devices as well as the amount of pump power needed for lasing (iii) The use of upconversion thin films which permit the integration of the multiwavelength upconversion waveguide lasers with other photonic devices such as semiconductor laser diodes, modulators, couplers, beam shaping or beam scanning devices increasing their versatility.

BRIEF DESCRIPTION OF THE DRAWINGS

FIG. 1 shows top, side, and front views of a multiwavelength upconversion waveguide laser in accordance with this invention;

FIG. 2 shows an alternate embodiment (top, side, and front views) of a multiwavelength upconversion waveguide laser in accordance with this invention;

DETAILED DESCRIPTION OF THE PREFERRED EMBODIMENTS

Figure 4:
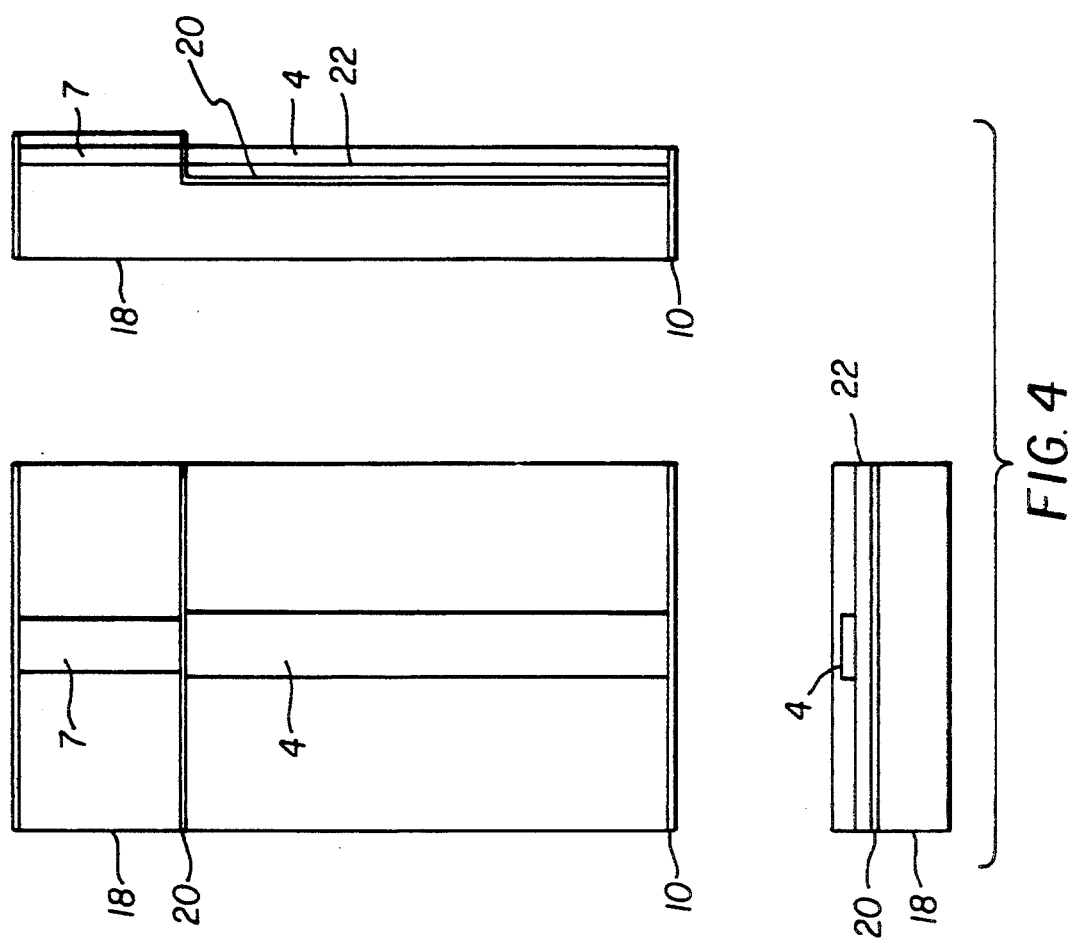
FIG. 4 shows an alternate embodiment (top, side, and front views) of a multiwavelength upconversion waveguide laser in accordance with this invention.

A multiwavelength upconversion waveguide laser is shown schematically in FIG. 1. A thin film of an upconverting material is deposited on a suitable substrate 2. A suitable substrate consists of a material which is transparent for the wavelengths of interest and has a refractive index which is lower than the upconverting thin film material to permit waveguiding in the thin film material. This upconverting thin film may consist of a rare earth doped metal fluoride such as Ba-Ln-F or Ca-Ln-F, where Ln is Yttrium, Ytterbium, Praseodymium, Holmium, Erbium, Thulium, or a combination thereof. For example, it may consist of an amorphous thin film of Ba-Y-Yb-F doped with Tm and/or Er (henceforth denoted as Tm, Er:Ba-Y-Yb-F), deposited on a polished fused silica substrate as detailed in above-cited U.S. application Ser. No. 08/186,400. Alternatively, the thin film material may consist of a crystalline thin film of Tm, Er:Ba-Y-Yb-F as outlined in the above-cited U.S. application Ser. No. 08/186,415. In this case, the substrate may consist of a oriented metal fluoride wafer such as a (100) oriented single crystalline $BaF_2$ or $CaF_2$ wafer. A channel waveguide 4 is formed in the thin film. This may be accomplished by ion-milling a portion of the thin film to form a ridge. An alternative approach of forming a channel waveguide is through strip loading. This is accomplished by depositing a thin film of an optically transparent material on top of the upconverting thin film and patterning it into a strip by photolithographic means and subsequent etching. Lift-off techniques may also be employed to form a strip. In the case of an Tm, Er:Ba-Y-Yb-F thin film, the thin film material for the strip may be $SiO_2$. Such waveguide production techniques are outlined in the thin film art. The channel waveguide should be of sufficient width and depth to support the lowest order optical mode at the pump wavelength. Such design parameters are well known in the waveguide art. The channel waveguide should have a sufficient length in order to provide the gain necessary for lasing. The precise length will depend on the exact composition of the upconverting thin film material. Approximate lengths may usefully range between 0.5 mm and 50 mm. A conventional semiconductor laser diode 6 end coupled by aligning the semiconductor laser diode waveguide 7 to the channel waveguide 4 serves as an optical pump. In the case of a Tm, Er:Ba-Y-Yb-F thin film the semiconductor laser diode should operate at a wavelength between 950 nm and 980 nm with 960 nm being the optimal wavelength. Alternatively, the semiconductor laser diode may operate at a wavelength in the range of 645 nm to 665 nm or 675 nm to 685 nm with 655 nm being an optimal wavelength. It is recognized that other rare earth dopants may require different pump wavelengths. The semiconductor laser diode 6 may be spectrally multi-mode but should be spatially single mode for efficient coupling. The power requirements will vary according to the upconversion channel waveguide laser efficiency and application. The input facet of the channel waveguide 4 contains an input optical coating 8 which transmits as much of the pump radiation as possible while reflecting as much of the desired visible or ultraviolet wavelength radiation as possible. Such coating techniques are well known in the art. The output end of the channel waveguide 4 contains an output optical coating 10 which is designed to reflect a portion of the desired visible or ultraviolet wavelength radiation while transmitting a portion of the visible or ultraviolet wavelength radiation. This output optical coating on the output facet completes the optical resonator which also includes the input optical coating 8 and channel waveguide 4. The output optical coating 10 may be designed to reflect a portion of only one specific visible or ultraviolet wavelength or more than one visible or ultraviolet wavelength depending on the laser wavelength(s) required. The optimum percentage of reflectivity of the output optical coating will vary depending on the gain and loss properties of the resonator. Such design parameters and coating techniques are well known in the laser art.

In another embodiment of the invention schematically illustrated in FIG. 2 Bragg grating reflectors 12 replace the output optical coating 10 of FIG. 1. The Bragg grating reflectors may be produced by first forming a periodic masking layer with photoresist exposed by standard holographic techniques and then etched using standard ion-milling to remove material in the unmasked regions. An alternative method for producing Bragg grating reflectors is to deposit a thin film layer of an optically transparent material on the top surface of the channel waveguide 4 where then a periodic masking layer is formed and etched as described above. The thin film material may be organic or inorganic. Qualifying thin film materials include $SiO_2$, $TaO_5$, $Si_3N_4$, or the like. These two methods for producing Bragg grating reflectors constitute the forming of Bragg grating reflectors in or on the channel waveguide, respectively. The Bragg grating reflectors 12 should be located at the end of the channel waveguide 4. The distance between the Bragg grating reflectors 12 and the end of the channel waveguide 4 may have zero length or may be longer depending on the application. The end facet of the channel waveguide contains an anti-reflection coating 14 for the desired radiation wavelengths. The rest of the device remains the same as in FIG. 1. In FIG. 2 three Bragg grating reflectors 12 are employed as output couplers each optimized to reflect a specific percentage of radiation at one wavelength without significantly reflecting radiation at the other visible or ultraviolet wavelengths. A portion of the visible or ultraviolet radiation which is not reflected is transmitted at the output facet of the channel waveguide 4. For example, the Bragg grating reflectors may be optimized for visible wavelengths corresponding to the red, green, and blue regions of the spectrum producing a RGB laser device. It is recognized that fewer or more than three gratings may be employed to achieve lasing at fewer or more than three wavelengths. The distance between said Bragg grating reflectors should be large enough as to not introduce undesired Bragg grating reflector artifacts. The wavelength at which the maximum reflectivity occurs may be controlled by the grating period, $\Lambda = m(\lambda/2N_{eff})$ (see FIG. 2), as given by the Bragg condition, where $\lambda$ is the wavelength at peak reflectivity, $N_{eff}$ is the channel waveguide effective index of refraction, and m is the grating order. The grating reflectivity may be controlled by the grating length, the ratio of grating depth to channel waveguide depth, and the channel waveguide effective index of refraction. The grating reflectivity increases with increasing length and with an increased ratio of grating depth to channel waveguide depth as well as with an increasing channel waveguide effective index of refraction. The optimum percentage of reflectivity of the Bragg grating reflectors will vary depending on the round trip gain and loss properties of the resonator. Such Bragg grating reflector design and fabrication techniques are well known in the art. (See J. E. Roman and K. A. Winick, Appl. Phys. Lett. 61, 2744 (1992)).

Figure 3:
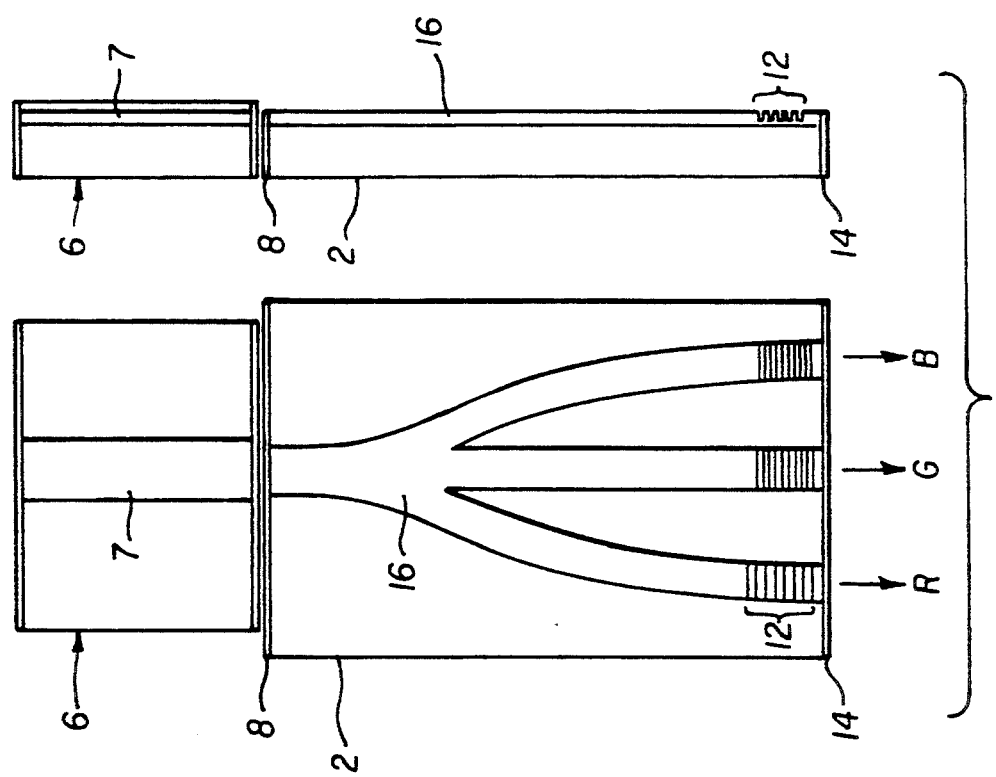
FIG. 3 shows an alternate embodiment (top and side views) of a multiwavelength upconversion waveguide laser in accordance with this invention.

An alternate embodiment of the upconversion waveguide laser device is shown schematically in FIG. 3. In this embodiment a branched channel waveguide 16 contains three branches each optimized for a different wavelength by the formation of the appropriate Bragg grating reflector 12 in or on each branch of the branched channel waveguide 16. In this way, three optical resonators comprising the input optical coating, channel waveguides, and Bragg grating reflectors are formed for three distinct visible or ultraviolet radiation wavelengths. The same fabrication and design considerations apply as for the Bragg grating reflectors in the device of FIG. 2. The Bragg grating reflectors may be optimized for visible wavelengths corresponding to the red, green, and blue regions of the spectrum. The channel waveguide branch should be designed and fabricated such that it presents a low optical loss to the circulating laser mode. Such design and fabrication techniques are well known in the art. It is recognized that less than three or more than three channel waveguide branches with appropriate Bragg grating reflectors could be employed to achieve lasing at less than three or more than three radiation wavelengths respectively. In addition, a channel waveguide combiner could be used to combine the channel waveguides into one channel waveguide capable of supporting the desired radiation wavelengths. (See FIG. 5)

A monolithically integrated version of the device is illustrated in FIG. 4. A semiconductor laser diode wafer 18 is selectively etched to expose the end facet of the semiconductor laser diode waveguide 7. The semiconductor laser diode wafer 18 may be made of InGaAs in the case of pump wavelengths in the range of 950 nm and 980 nm or it may be of AlGaInP in the case of pump wavelengths in range of 645 nm to 665 nm or 675 nm to 685 nm. The selective etching may be accomplished by conventional techniques such as reactive ion etching (RIE). Such techniques are well known in the semiconductor processing art. A conformal optical coating 20 which is highly reflective at the desired visible or ultraviolet radiation wavelengths while partially reflecting at the pump wavelength is deposited on the exposed semiconductor laser diode waveguide 7 end facet. The conformal optical coating 20 should uniformly cover the laser diode waveguide 7 end facet to facilitate coupling from the laser diode waveguide to the channel waveguide 4. The reflectivity of the conformal optical coating is designed to optimize the power output of the semiconductor laser diode while in contact with the channel waveguide thin film material. In addition, the conformal optical coating reflects any stray pump radiation back into the channel waveguide 4 increasing the laser pump efficiency. Such optical coating techniques are well known in the semiconductor laser diode art. A buffer layer 22 is deposited on the semiconductor laser diode wafer 18 by conventional techniques such as thermal evaporation. This buffer layer is to ensure confinement of the optical mode in the channel waveguide since the semiconductor laser diode wafer will likely have a refractive index which is higher than the upconversion thin film material. With an upconverting thin film of Tm, Er:Ba-Y-Yb-F having an approximate index of refraction slightly higher than 1.5, a buffer layer of $SiO_2$ with a refractive index of approximately 1.45 would permit waveguiding to occur. Other metal oxide compounds as well as metal fluoride compounds may be employed as buffer layers if they have a low enough refractive index. An upconverting thin film is deposited on top of the buffer layer 22 and a channel waveguide 4 is formed in the same way as outlined in the discussion connected with FIG. 1. The thickness of the buffer layer and the upconverting thin film are such that the lowest order optical mode is supported in the channel waveguide 4. For the case of the Tm, Er:Ba-Y-Yb-F thin film and $SiO_2$ buffer layer combination on an InGaAs wafer, the useful thickness ranges are approximately 0.7 μm to 2.0 μm for the Tm, Er:Ba-Y-Yb-F thin film and 1.2 μm to 5.0 μm for the $SiO_2$ buffer layer. The selective etch in the semiconductor laser diode wafer 18 should be at a depth in order to maximize the amount of pump radiation coupled from the semiconductor laser diode waveguide 7 into the upconversion thin film material channel waveguide 4. This may require adjustment of the thickness of the buffer layer and/or upconversion thin film materials. The length considerations for the upconversion channel waveguide 4 is the same as outlined in the discussion connected with FIGS. 2 and 3. At the end of the channel waveguide 4 an output optical coating 10 is applied completing the optical resonator. It is recognized that other upconversion materials and buffer layer combinations may be used. It is also recognized that the device may employ one or more Bragg grating reflectors formed in or on the channel waveguide instead of the output optical coating 10 as outlined in the discussion connected with FIG. 2. Furthermore, the device may employ a two or more branched channel waveguide with appropriate Bragg grating reflectors pumped by a single semiconductor laser diode. (See FIG. 3). A channel waveguide combiner may also be employed. (See FIGS. 3 and 5).

Figure 5:
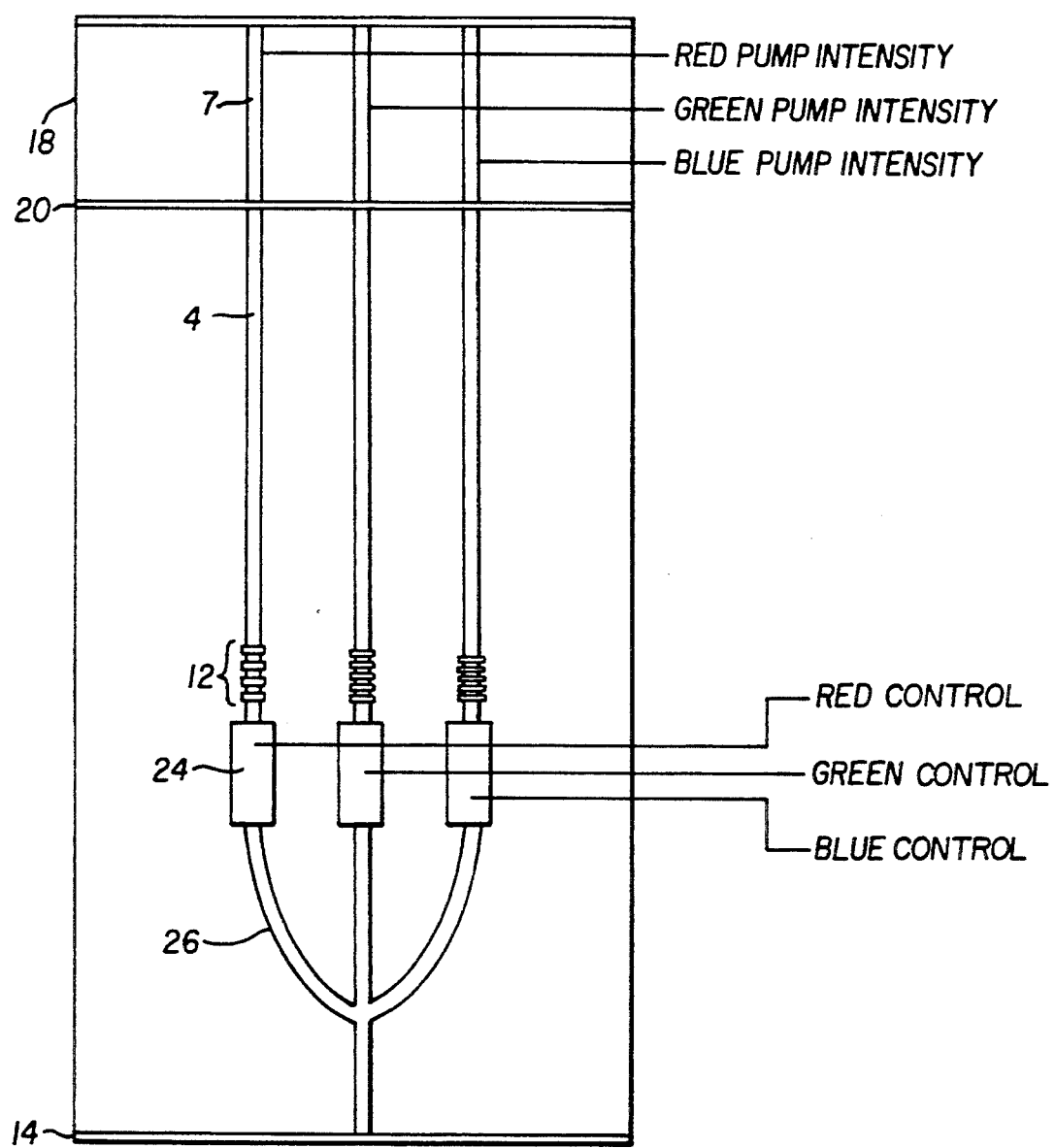
FIG. 5 shows an alternate embodiment (top view) of a multiwavelength upconversion waveguide laser in accordance with this invention.

In the embodiment illustrated in FIG. 5, the semiconductor laser diode wafer 18 contains three separate semiconductor laser diode waveguides 7. Each of these semiconductor laser diode waveguides are coupled into three separate optical resonators and lightwave modulators optimized for visible wavelengths in the red, green, and blue regions of the spectrum, respectively. The resonators are comprised of three channel waveguides 4, a reflective coating 20, and Bragg grating reflectors 12 formed in or on the channel waveguides each optimized for a distinct visible wavelength. The details of the reflective coating, channel waveguides, and Bragg grating reflectors are the same as that outlined in the discussion connected with FIG. 4. The three semiconductor laser diode waveguides 7 allow independent control of their intensity via independent control of their injection currents. By allowing control of the pump intensity it is possible to independently control the intensity of the red, green, and blue radiation. Three independently controllable lightwave modulators 24 are incorporated into the channel waveguides outside the optical resonators. The three modulators allow independent control of the visible radiation in response to data signals. The modulators may be Mach-Zender types employing electro-optic thin films. In this case voltages applied to each of the modulators would allow independent on/off control of the red, green, and blue wavelength radiation. It is also possible to operate such modulators in a continuously varying analog mode. Such modulator designs are well known in the art. It is recognized that other modulator schemes may be employed. The three channel waveguides are then combined into a single channel waveguide with a channel waveguide combiner 26 capable of supporting radiation of the three visible wavelengths. The design for such a combiner is available in the waveguide art. Finally, an anti-reflective coating 14 optimized for the visible radiation wavelengths is deposited on the semiconductor laser diode wafer end facet.

The invention has been described in detail with particular reference to preferred embodiments thereof, but it will be understood that variations and modifications can be affected within the spirit and scope of the invention.

PARTS LIST 2 substrate
4 channel waveguide
6 semiconductor laser diode
7 semiconductor laser diode waveguide
8 input optical coating
10 output optical coating
12 Bragg grating reflector
14 anti-reflection coating
16 branched channel waveguide
18 semiconductor laser diode wafer
20 conformal optical coating
22 buffer layer
24 lightwave modulator
26 channel waveguide combiner

What is claimed is:

1. A multiwavelength upconversion waveguide laser producing visible or ultraviolet wavelength radiation from relatively long wavelength radiation comprising:
   a) a semiconductor laser diode producing relatively long wavelength radiation;
   b) a thin film material that converts said relatively long wavelength radiation into radiation having one or more visible or ultraviolet wavelengths by an upconversion process of photon absorption energy transfer followed by emission wherein said relatively long wavelength radiation is at a wavelength in the range of 645 nm to 665 nm or 675 nm to 685 nm and said upconversion thin film material is an amorphous thin film of Thulium and/or Erbium doped Ba-Ln-F where Ln is Yttrium, or Ytterbium, or a combination thereof that produces radiation at one or more wavelengths in the ranges of 350 nm to 370 nm, 440 nm to 490 nm, and 500 nm to 560 nm;
   c) a channel waveguide for receiving said relatively long wavelength radiation, said channel waveguide having said thin film material; and
   d) an optical resonator comprising said channel waveguide which recirculates said visible or ultraviolet wavelength radiation.

2. A multiwavelength visible laser according to claim 1 wherein said channel waveguide is divided into two or more branches forming a branched channel waveguide.

3. A multiwavelength upconversion waveguide laser according to claim 1 wherein said optical resonator further comprises an input optical coating applied to the input facet of said channel waveguide which transmits said relatively long wavelength radiation while reflecting said visible or ultraviolet wavelength radiation and an output optical coating applied to the output facet of said channel waveguide which reflects a portion of said visible or ultraviolet wavelength radiation while transmitting a portion of said visible or ultraviolet wavelength radiation.

4. A multiwavelength upconversion waveguide laser according to claim 1 wherein said optical resonator further comprises an input optical coating applied to the input facet of said channel waveguide which transmits said relatively long wavelength radiation while reflecting said visible or ultraviolet wavelength radiation and one or more Bragg grating reflectors formed in or on said channel waveguide each reflecting a portion of said visible or ultraviolet wavelength radiation while transmitting a portion of said visible or ultraviolet wavelength radiation.

5. A multiwavelength upconversion waveguide laser producing visible or ultraviolet wavelength radiation from semiconductor laser diode radiation comprising:

a) a semiconductor laser diode producing radiation at a wavelength in the range of 645 nm to 665 nm, 675 nm to 685 nm, or 950 nm to 980 nm;

b) an amorphous thin film material of Thulium and or Erbium doped Ba-Ln-F where Ln is Yttrium, Ytterbium, or a combination thereof that converts said semiconductor laser diode radiation into ultraviolet and/or visible wavelength radiation having one or more of the wavelengths in the ranges of 350 nm to 370 nm, 440 nm to 490 nm, 500 nm to 560 nm, and 630 nm to 680 nm by an upconversion process of photon absorption energy transfer followed by emission;

c) a channel waveguide for receiving said semiconductor laser diode radiation said channel waveguide having said amorphous thin film material; and d) an optical resonator including said channel waveguide which recirculates said visible or ultraviolet wavelength radiation.

6. A multiwavelength visible laser according to claim 5 wherein said channel waveguide is divided into two or more branches forming a branched channel waveguide.

7. A multiwavelength upconversion waveguide laser according to claim 5 wherein said optical resonator further comprises an input optical coating applied to the input facet of said channel waveguide which transmits said semiconductor laser diode radiation while reflecting said visible or ultraviolet wavelength radiation and an output optical coating applied to the output facet of said channel waveguide which reflects a portion of said visible or ultraviolet wavelength radiation while transmitting a portion of said visible or ultraviolet wavelength radiation.

8. A multiwavelength upconversion waveguide laser according to claim 5 wherein said optical resonator further comprises an input optical coating applied to the input facet of said channel waveguide which transmits said semiconductor laser diode radiation while reflecting said visible or ultraviolet wavelength radiation and one or more Bragg grating reflectors formed in or on said channel waveguide each reflecting a portion of said visible or ultraviolet wavelength radiation while transmitting a portion of said visible or ultraviolet wavelength radiation.

9. A multiwavelength upconversion waveguide laser producing visible or ultraviolet wavelength radiation from relatively long wavelength radiation comprising:

a) a semiconductor laser diode producing relatively long wavelength radiation;

b) a thin film material that converts said relatively long wavelength radiation into radiation having one or more visible or ultraviolet wavelengths by an upconversion process of photon absorption energy transfer followed by emission wherein said relatively long wavelength radiation is at a wavelength in the range of 645 nm to 665 nm or 675 nm to 685 nm and said upconversion thin film material is an amorphous thin film of Thulium and/or Erbium doped Ba-Ln-F where Ln is Yttrium, Ytterbium, or a combination thereof that produces radiation at one or more wavelengths in the ranges of 350 nm to 370 nm, 440 nm to 490 nm, and 500 nm to 560 nm;

c) a channel waveguide for receiving said relatively long wavelength radiation monolithically integrated with said semiconductor laser diode, said channel waveguide having said thin film material;

d) one or more transparent buffer layers interposed between said semiconductor laser diode and said channel waveguide to ensure confinement of said relatively long wavelength radiation in said channel waveguide; and e) an optical resonator comprising said channel waveguide which recirculates said visible or ultraviolet wavelength radiation.

10. A multiwavelength upconversion waveguide laser according to claim 9 wherein said relatively long wavelength radiation is at a wavelength in the range of 950 nm to 980 nm and said upconversion thin film material is an amorphous thin film of Thulium and/or Erbium doped Ba-Ln-F where Ln is Yttrium, Ytterbium, or a combination thereof that produces radiation at one or more wavelengths in the ranges of 350 nm to 370 nm, 440 nm to 490 nm, 500 nm to 560 nm, and 630 nm to 680 nm.

11. A multiwavelength upconversion waveguide laser according to claim 10 wherein said optical resonator further comprises a reflective coating applied to the semiconductor laser diode facet which reflects a portion of said relatively long wavelength radiation while transmitting a portion of said visible or ultraviolet wavelength radiation and an output optical coating applied to the output facet of said channel waveguide which reflects a portion of said visible or ultraviolet wavelength radiation while transmitting a portion of said visible or ultraviolet wavelength radiation.

12. A multiwavelength upconversion waveguide laser according to claim 9 wherein said relatively long wavelength radiation is at a wavelength in the range of 950 nm to 980 nm and said upconversion thin film material is a crystalline thin film of Thulium and/or Erbium doped Ba-Ln-F where Ln is Yttrium, Ytterbium, or a combination thereof that produces radiation at one or more wavelengths in the ranges of 350 nm to 370 nm, 440 nm to 490 nm, 500 nm to 560 nm, and 630 nm to 680 nm.

13. A multiwavelength visible laser according to claim 9 wherein said channel waveguide is divided into two or more branches forming a branched channel waveguide.

14. A multiwavelength visible laser according to claim 9 wherein said transparent buffer layers are composed of metal fluoride materials.

15. A multiwavelength visible laser according to claim 9 wherein said transparent buffer layers are composed of metal oxide materials.

16. A multiwavelength upconversion waveguide laser according to claim 9 wherein said optical resonator further comprises a reflective coating applied to the semiconductor laser diode facet which reflects a portion of said relatively long wavelength radiation while transmitting a portion of said visible or ultraviolet wavelength radiation and one or more Bragg grating reflectors formed in or on said channel waveguide each reflecting a portion of said visible or ultraviolet wavelength radiation while transmitting a portion of said visible or ultraviolet wavelength radiation.

17. A multiwavelength upconversion waveguide laser producing visible or ultraviolet wavelength radiation from relatively long wavelength radiation comprising:

a) a semiconductor laser diode producing relatively long wavelength radiation;

b) a thin film material that converts said relatively long wavelength radiation into radiation having one or more visible or ultraviolet wavelengths by an upconversion process of photon absorption energy transfer followed by emission wherein said relatively long wavelength radiation is at a wavelength in the range of 645 nm to 665 nm or 675 nm to 685 nm and said upconversion thin film material is a crystalline thin film of Thulium and/or Erbium doped Ba-Ln-F where Ln is Yttrium Ytterbium, or a combination thereof that produces radiation at one or more wavelengths in the ranges of 350 nm to 370 nm, 440 nm to 490 nm, and 500 nm to 560 nm;

c) a channel waveguide for receiving said relatively long wavelength radiation, said channel waveguide having said thin film material; and d) an optical resonator comprising said channel waveguide which recirculates said visible or ultraviolet wavelength radiation.

18. A multiwavelength upconversion waveguide laser producing visible or ultraviolet wavelength radiation from relatively long wavelength radiation comprising:

a) a semiconductor laser diode producing relatively long wavelength radiation;

b) a thin film material that converts said relatively long wavelength radiation into radiation having one or more visible or ultraviolet wavelengths by an upconversion process of photon absorption energy transfer followed by emission wherein said relatively long wavelength radiation is at a wavelength in the range of 950 nm to 980 nm and said upconversion thin film material is an amorphous thin film of Thulium and/or Erbium doped Ba-Ln-F where Ln is Yttrium, Ytterbium, or a combination thereof that produces radiation at one or more wavelengths in the ranges of 350 nm to 370 nm, 440 nm to 490 nm, 500 nm to 560 nm, and 630 nm to 680 nm;

c) a channel waveguide for receiving said relatively long wavelength radiation monolithically integrated with said semiconductor laser diode, said channel waveguide having said amorphous thin film material;

d) one or more transparent buffer layers interposed between said semiconductor laser diode and said channel waveguide to ensure confinement of said relatively long wavelength radiation in said channel waveguide; and e) an optical resonator comprising said channel waveguide which recirculates said visible or ultraviolet wavelength radiation.

19. A multiwavelength upconversion waveguide laser producing visible or ultraviolet wavelength radiation from relatively long wavelength radiation comprising:

a) a semiconductor laser diode producing relatively long wavelength radiation;

b) a thin film material that converts said relatively long wavelength radiation into radiation having one or more visible or ultraviolet wavelengths by an upconversion process of photon absorption energy transfer followed by emission wherein said relatively long wavelength radiation is at a wavelength in the range of 645 nm to 665 nm or 675 nm to 685 nm and said upconversion thin film material is a crystalline thin film of Thulium and/or Erbium doped Ba-Ln-F where Ln is Yttrium, Ytterbium, or a combination thereof that produces radiation at one or more wavelengths in the ranges of 350 nm to 370 nm, 440 nm to 490 nm, and 500 nm to 560 nm;

c) a channel waveguide for receiving said relatively long wavelength radiation monolithically integrated with said semiconductor laser diode, said channel waveguide having said thin film material;

d) one or more transparent buffer layers interposed between said semiconductor laser diode and said channel waveguide to ensure confinement of said relatively long wavelength radiation in said channel waveguide; and e) an optical resonator comprising said channel waveguide which recirculates said visible or ultraviolet wavelength radiation.

* * * * *